United States Patent
Siegman et al.

(10) Patent No.: US 11,410,254 B2
(45) Date of Patent: Aug. 9, 2022

(54) METHOD AND SYSTEM FOR ASSESSING HAZARD RISKS ASSOCIATED WITH GEOGRAPHICAL LOCATIONS

(71) Applicant: Guidewire Software, Inc., San Mateo, CA (US)

(72) Inventors: John C. Siegman, San Diego, CA (US); Brady Foust, Eau Claire, WI (US); Robert Frady, Ladera Ranch, CA (US)

(73) Assignee: Guidewire Software, Inc., San Mateo, CA (US)

( * ) Notice: Subject to any disclaimer, the term of this patent is extended or adjusted under 35 U.S.C. 154(b) by 422 days.

(21) Appl. No.: 15/901,106

(22) Filed: Feb. 21, 2018

(65) Prior Publication Data
US 2019/0259112 A1    Aug. 22, 2019

(51) Int. Cl.
*G06Q 50/16* (2012.01)
*G06F 16/29* (2019.01)

(52) U.S. Cl.
CPC ............. *G06Q 50/16* (2013.01); *G06F 16/29* (2019.01)

(58) Field of Classification Search
CPC ................................ G06Q 50/16; G06F 16/29
USPC .................................................. 705/21, 315
See application file for complete search history.

(56) References Cited

U.S. PATENT DOCUMENTS

| | | | | |
|---|---|---|---|---|
| 2009/0043637 A1* | 2/2009 | Eder | ...................... | G06N 7/005 705/35 |
| 2011/0161116 A1* | 6/2011 | Peak | .................. | G06Q 20/3223 345/173 |
| 2012/0123806 A1* | 5/2012 | Schumann, Jr. | ........ | G06Q 40/08 705/4 |
| 2013/0282410 A1* | 10/2013 | Petersen | ............ | G06Q 10/0635 705/4 |
| 2014/0350970 A1* | 11/2014 | Schumann, Jr. | ........ | G06Q 40/08 705/4 |
| 2017/0161859 A1* | 6/2017 | Baumgartner | ......... | G06Q 50/26 |

\* cited by examiner

*Primary Examiner* — Rokib Masud
(74) *Attorney, Agent, or Firm* — Van Pelt, Yi & James LLP

(57) ABSTRACT

A method and a system for assessing hazard risks associated with geographical locations are provided. The server receives information associated with a geographical location from a user device. The server identifies a hazard associated with the geographical location based on the historical hazard data. The server retrieves one or more files associated with the hazard. The server determines a first risk score for the geographical location based on at least the one or more files or a first set of rules associated with the hazard. The server determines a second risk score for the geographical location based on at least the one or more files or a second set of rules associated with the hazard. The server determines the second risk score when a criterion associated with the hazard is met. The server communicates at least one of the first risk score or the second risk score to a user.

20 Claims, 11 Drawing Sheets

METHOD AND SYSTEM FOR ASSESSING HAZARD RISKS ASSOCIATED WITH GEOGRAPHICAL LOCATIONS

FIELD OF THE INVENTION

The present invention relates generally to assessing risks, and more particularly, to a method and a system for assessing hazard risks associated with geographical locations.

BACKGROUND

Hazards, both natural and man-made, have led to severe damages to human life and property. Examples of such hazards include floods, fire from any cause, a hailstorm, a tornado, a hurricane, an earthquake, radiations from radioactive zones and nuclear power plants, a landslide, volcanic eruptions, brownfield or superfund sites, crime, and the like. Hazards may affect specific geographical locations due to risk caused by environmental conditions or man-made offences. Therefore, it has become paramount for an individual seeking to buy, move in, or rent a property in an area to assess a hazard risk associated with the area.

Traditionally, hazard risk scores are determined to assess hazard risks for the property. The hazard risk scores are determined by whether the property is inside or outside a hazard risk zone that is likely to be affected by a hazard. This is done by performing a geospatial operation on a geospatial file. The geospatial file includes depiction of various hazards in form of geospatial elements such as polygons, lines, points, or raster cells in a map of a geographical area such as a country or a state. For example, to determine a flood risk for a property, a point-in-polygon (PIP) operation, i.e., geospatial operation is performed on the geospatial file that depicts a geographical area in the form of polygons. Each polygon of the geographical area is classified into a hazard (flood) risk zone such as a high risk zone, a moderate risk zone, or a low risk zone. Based on the hazard risk zone, a hazard risk score is associated with each polygon. The point-in-polygon (PIP) operation identifies a polygon in which the property is located and outputs the hazard risk score of the identified polygon as the hazard risk score of the property. Thus, the hazard risk score of the property is determined based on a single factor, i.e., whether the property is in the high risk zone, the moderate risk zone, or the low risk zone. Since the determination of the hazard risk score is based on a single factor, the information obtained is insufficient to thoroughly assess the hazard risk associated with the property. Thus, the hazard risk score obtained by the abovementioned method does not yield accurate results and would lead an individual into a false sense of security.

The traditional methods further determine the hazard risk scores for the polygons beforehand and embed it in the geospatial file. When a hazard risk assessment for the geographical location or the property is requested by the individual, the hazard risk score of the polygon associated with the geographical location or the property is obtained from the geospatial file and provided to the individual. As the hazard risk scores are determined beforehand, they do not depict real time data and hence lead to inaccurate assessment of the hazard risks. Further, to include any additional data in the geospatial file, the geospatial file has to be rebuilt with new hazard risk scores.

In light of the foregoing, there exists a need for a technical and more reliable solution that provides a method of assessing hazard risks associated with the geographical location that improves the accuracy of the risk scores, relies on more than one factor, and solves the aforementioned problems of the traditional methods.

SUMMARY

Various embodiments of the present invention provide a method and a system for assessing hazard risks associated with geographical locations. The method includes multiple operations that are executed by a server of the system to assess the hazard risks associated with the geographical locations. The server receives information associated with a geographical location from a user device over a communication network. The information includes at least an address or a geographical position of the geographical location. The server identifies a hazard associated with the geographical location. The server identifies the hazard based on the historical hazard data. The hazard includes natural or man-made hazards. The server retrieves the historical hazard data from a memory. The server further retrieves one or more files associated with the hazard from the memory. The one or more files include a plurality of geospatial elements. The plurality of geospatial elements includes at least lines, points, polygons, or raster cells.

The server determines a first risk score for the geographical location based on at least the one or more files or a first set of rules associated with the hazard. The server further determines a second risk score for the geographical location. The server determines the second risk score based on at least the one or more files or a second set of rules associated with the hazard. The server determines the second risk score when a criterion associated with the hazard is met. The criterion associated with the hazard is based on at least the first risk score or the one or more files. The server communicates at least one of the first risk score or the second risk score associated with the geographical location to a user. The first and second risk scores indicate a level of severity of the hazard for the geographical location. The server communicates the first risk score to the user when the criterion associated with the hazard is unmet.

The server further determines a third risk score for the geographical location. The server determines the third risk score based on at least the one or more files or a third set of rules associated with the hazard. The server determines and communicates the third risk score when the criterion associated with the hazard is unmet. Thus, the method and the system of the present invention improve an accuracy of the risk scores by considering multiple factors while determining the risk scores associated with the geographical locations. Further, the method and the system of the present invention determine the risk scores on-the fly, i.e., dynamically, and do not rely on predetermined risk scores.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice-versa.

Figure 1:
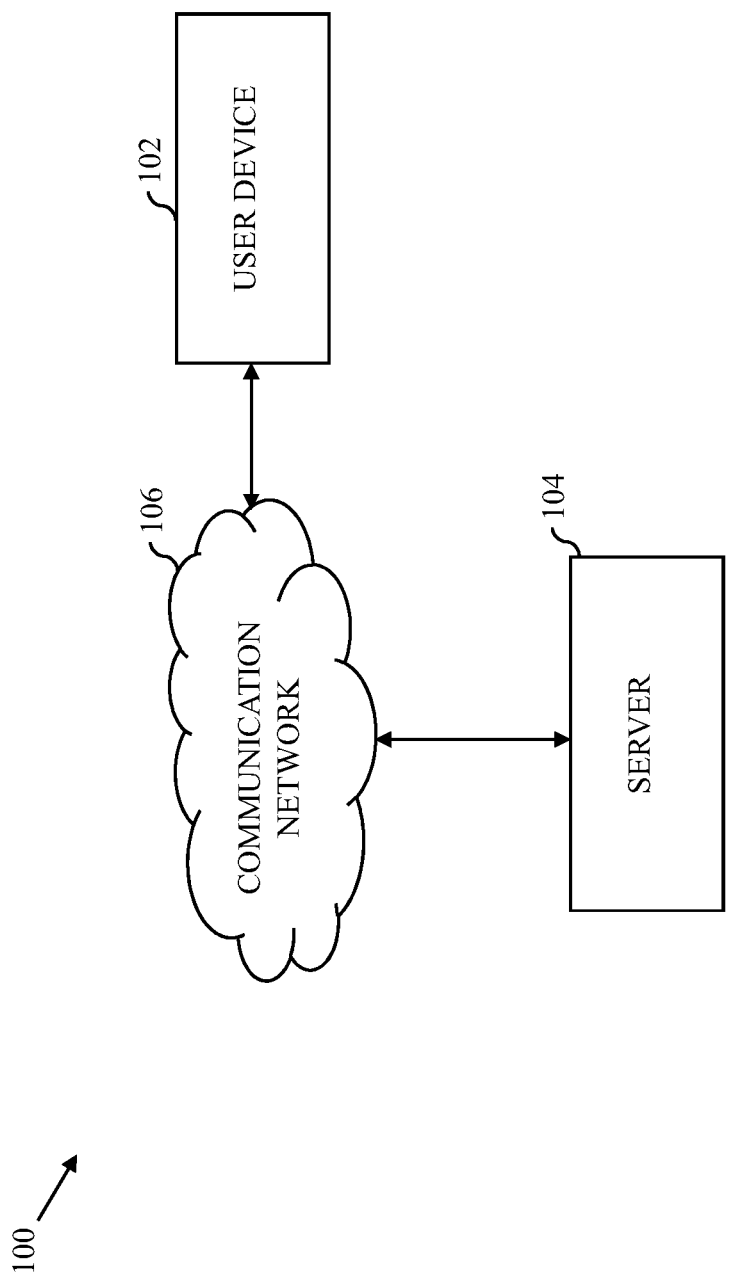
FIG. 1 illustrates an environment for assessing hazard risks associated with geographical locations in which various embodiments of the present invention are practiced.

Further areas of applicability of the present invention will become apparent from the detailed description provided hereinafter. It should be understood that the detailed description of exemplary embodiments are intended for illustration purposes only and are, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes systems and methods for assessing hazard risks associated with geographical locations. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Hazards are naturally occurring events and man-made activities that have a potential to cause damage to humans and property. Hazards include, but are not limited to, flooding, coastal storm surge, tsunami, wildfire, fire from any cause, damaging wind, hailstorm, tornado, lightning strikes, hurricane, earthquake, fracking induced earthquake, radiations from radioactive zones and nuclear power plants, wind borne debris, landslide, lava flow, volcanic eruptions, brownfield or superfund sites, leaking of underground storage tanks, and crime. Hereinafter, various methods of assessing the hazard risks for the geographical locations have been described that will become apparent to a person having ordinary skill in the relevant art.

Referring now to FIG. 1, an environment 100 for assessing hazard risks associated with geographical locations in which various embodiments of the present invention are practiced is shown. The environment 100 assesses the hazard risks on-the-fly, i.e., dynamically, as disclosed herein. The environment 100 includes a user device 102 and a server 104 that communicate with each other by way of a communication network 106. Examples of the communication network 106 include, but are not limited to, a wireless fidelity (Wi-Fi) network, a light fidelity (Li-Fi) network, a satellite network, the Internet, a mobile network such as a cellular data network, high speed packet access (HSPA), or any combination thereof.

The user device 102 is a computing device that is used by a user to perform various activities. The user uses the user device 102 to obtain hazard risks for a geographical location. In an embodiment, the user device 102 transmits the geographical location to the server 104 by means of a service application installed on the user device 102 or a web page hosted by the server 104 which is accessed on the user device 102. To obtain the hazard risks, the user inputs information associated with the geographical location such as an address or a geographical position, i.e., latitude and longitude, by means of the service application or the web page. In another embodiment, the server 104 receives the address or the geographical position based on the current geographical location of the user device 102 over the communication network 106. In yet another embodiment, the user transmits a set of geographical locations. In one embodiment, the user transmits the set of geographical locations to the server 104 by submitting an electronic database of addresses by way of an Application Programming Interface (API) or a Batch processing Interface (BPI).

The user device 102 further displays a risk score, including first and second risk scores, for the geographical location. The risk score indicates a level of severity of the hazard. The risk score can be qualitative or quantitative. In an embodiment, the risk scores are alphabets, for example an 'A' indicating that the geographical location is least likely to be affected by the hazard, a 'B' indicating that the geographical location is less likely to be affected by the hazard, a 'C' indicating that the geographical location is moderately likely to be affected by the hazard, a 'D' indicating that the geographical location is more likely to be affected by the hazard, and an 'F' indicating that the geographical location is most likely to be affected by the hazard. In another embodiment, the first and second risk scores are numerals, for example '0' indicating that the geographical location is least likely to be affected by the hazard and '14' indicating that the geographical location is most likely to be affected by the hazard. Examples of the user device 102 include, but are not limited to, a personal computer, a laptop, a smartphone, a tablet, a phablet, a personal digital assistant (PDA), and the like. The user device 102 has been described in detail in conjunction with FIG. 2.

The server 104 is a computing device, a network of computers, a software framework, or a combination thereof, that may provide a generalized approach to create the server implementation. In an embodiment, the operation of the server 104 may be dedicated to execution of procedures, such as, but not limited to; programs, routines, or scripts stored in one or more memories for supporting its applied applications. Examples of the server 104 include, but are not limited to, a personal computer, a laptop, or a network of computer systems. The server 104 may be realized through various web-based technologies such as, but not limited to, a Java web-framework, a .NET framework, a PHP framework, or any other web-application framework. The various operations of the server 104 have been described in detail in conjunction with FIGS. 2-6.

The server 104 determines historical hazard data for the geographical location by taking into consideration the natural and man-made hazards that have occurred and level of damages caused due to the hazards at the geographical location in the past. The server 104 further stores it in a memory (shown in FIG. 2). In an embodiment, the server 104 receives the historical hazard data from a global database or a regional database and stores it in the memory. In another embodiment, the server 104 receives the historical hazard data from a remote server (not shown). The server 104 further considers the hazards and the level of damages caused due to the hazards to the geographical areas that are in the vicinity of the geographical location. In an example, for a geographical location 'R', the server 104 determines the historical hazard data for the geographical location 'R'. The historical hazard data may include information about a Storm 'S' that occurred in the year 'X' and the damage caused due to the storm, Hurricane 'T' that caused flooding in the year 'Y' and the level of damage caused by the Hurricane 'T', and any other natural or man-made hazards that have occurred in the geographical location 'R'. Thus, the server 104 identifies 'storm' and 'hurricane' as the hazards associated with the geographical location 'R'. The server 104 further considers the hazards and the level of damages caused in areas 'U' and 'V' that are in the vicinity of the geographical location 'R'. Thus, to determine the hazard associated with the geographical location 'R', the server 104 retrieves the historical hazard data when the server 104 receives the geographical location 'R' by way of the communication network 106.

The server 104 stores a set of files (such as geospatial files) that include first through third files that are associated with the hazard in the memory. The set of files include geographical areas and depiction of hazards in a form of geospatial elements such as polygons, lines, points, or raster cells. In an example, for hazards such as floods, the geospatial files include a geographical area that is divided into polygons where each polygon indicates a flood risk zone. In another example, the geographical area is divided into raster cells where each raster cell indicates a hazard risk zone. To determine hazards such as fire, the geographical area may include points to depict objects such as fire hydrant points. Further for hazards such as earthquakes, earthquake lines are depicted on the geographical area to indicate the probability of occurrence of earthquakes. The server 104 stores data (including first and second data) associated with the geospatial files that may include, but not be limited to risk values or distance between two points in a geospatial file in the memory. The server 104 further stores sets of rules (that include first through third sets of rules) associated with each hazard in the memory. Thus, when the server 104 identifies the hazard based on the historical hazard data, the server 104 retrieves the associated set of files and the sets of rules to determine the risk score for the hazard. In an example, the server 104 receives a geographical location 'G' from the user device 102. The server 104 identifies three hazards, i.e., tsunami, fire, and crime, which are associated with the geographical location 'G'. To determine the risk score associated with the hazard 'tsunami', the server 104 retrieves the set of files associated with tsunami. The first file may depict coastal lines in a geographical area that includes the geographical location 'G'. Further, the second file may depict the geographical area in the form of tsunami zones such that each tsunami zone indicates a tsunami risk associated with the tsunami zone.

The server 104 performs a first set of geospatial operations on the first file to extract the first data from the memory. The first set of geospatial operations may include, but are not limited to, a point-in-polygon (PIP) operation, a distance-to-line (DTL) operation, a distance-to-point (DTP) operation, a drive-time-time (DTT) operation, and a drive-time-distance (DTD) operation. The PIP operation checks if the geographical location lies in a polygon and identifies the polygon to obtain information such as risk value associated with the polygon. The DTL operation is performed on a geospatial file (that includes hazards depicted in the form of lines) to determine a distance between a geographical location and a line. The DTP operation is performed on a geospatial file that includes points (in an example, objects such as fire hydrant points) to determine a distance between a geographical location and a point. Similarly, the DTT operation is performed on a geospatial file that includes points to determine a drive-time between two points (such as objects, locations, and the like). The DTD operation is performed on a geospatial file that includes points to determine a drive distance between two points. The first data includes information associated with the geographical location and the hazard such as risk values, distances between the geographical locations and geospatial elements, and the like. The server 104 determines the first risk score based on the first data and the first set of rules associated with the hazard. In the example, the server 104 performs the DTL operation on the first file to obtain the distance between the geographical location and a nearest coast line. The server 104 determines the first risk score based on the first data, i.e., the distance, and the first set of rules that are associated with 'tsunami'. The first set of rules dictate that if the geographical location is within 20 miles from a coast, the first risk score is one of 'C', 'D', or 'F' and if the distance is more than 20 miles from the coast, the first risk score is one of 'A' or 'B'.

To improve an accuracy of hazard risk assessment, the server 104 further initiates a criterion associated with the hazard. In an example, the criterion includes an additional factor associated with the hazard to be considered while determining the first risk score. In another example, the criterion includes evaluating a condition associated with the first risk score. The server 104 communicates the first risk score to the user on the user device 102 if the criterion is not met. If the criterion is met, the server 104 determines the second risk score for the geographical location to improve the accuracy of the first risk score. To determine the second risk score, the server 104 performs a second set of geospatial operations on the second file to extract the second data from the memory. The second set of geospatial operations may include, but are not limited to, the PIP operation, the DTL operation, the DTP operation, the DTT operation, and the DTD operation. The second data includes information associated with the geographical location and the hazard such as the risk values, the distances between the geographical locations and geospatial elements, and the like. The server 104 determines the second risk score based on the second data and the second set of rules associated with the hazard. In the example, the criterion includes checking if the first risk score is 'A' or 'B', i.e., the geographical location is more than 20 miles from the coast. If the criterion is not met, i.e., if the first risk score is not 'A' or 'B', the server 104 communicates the first risk score, for example 'D', to the user on the user device 102. If the criterion is met, the server 104 performs a PIP operation on the second file to determine if the geographical location is in the tsunami zone. The server 104 determines the second risk score based on a result of the PIP operation, and the second set of rules that are associated with the hazard 'tsunami'. The result of the PIP operation, i.e., the second data indicates if the geographical location is located inside the tsunami zone. The second set of rules dictate that if the first risk score is 'A' or 'B' and the geographical location is located inside the tsunami zone, the second risk score is 'C'. The server 104 further communicates the second risk score to the user by way of the user device 102.

In another embodiment, if the criterion is not met, the server 104 determines a third risk score based on third data extracted from the third file and the third set of rules associated with the hazard that are retrieved from the memory. The server 104 further communicates the third risk score to the user on the user device 102. It will be apparent to a person skilled in the art that a method for determination of the third risk score is same as the determination of the first and second risk scores.

Thus, in the present invention, the risk score associated with the geographical location is not predetermined. On the contrary, the risk scores, such as the first through third risk scores are determined on-the-fly. Further, the present invention relies on more than one factor, in the example, distance of the geographical location from the coast line and presence of the geographical location in the tsunami zone, to improve the accuracy of hazard risk assessment. It will be apparent to a person skilled in the art that the server 104 may determine additional risk scores other than the first through third risk scores, for assessment of hazard risks. The server 104 further communicates the additional risk scores to the user by way of the user device 102.

It will be apparent to a person skilled in the art the server 104 performs the aforementioned steps to identify corresponding risk scores associated with the hazards 'fire' and 'crime'. It will further be apparent to a person skilled in the art that the server 104 provides three risk scores as a final risk score that correspond to tsunami, fire, and crime, to the user on the user device 102.

It will be understood by those skilled in the art that the examples provided in the present invention are for clarity of understanding and should not be considered as the only implementation of the present invention. Hence, the factors described in the examples may change. Similarly, the sequence of factors may vary. It will also be apparent to those skilled in the art that the number of factors is not restricted to two and the server 104 may consider more than two factors for determination of hazard risk scores.

Figure 2:
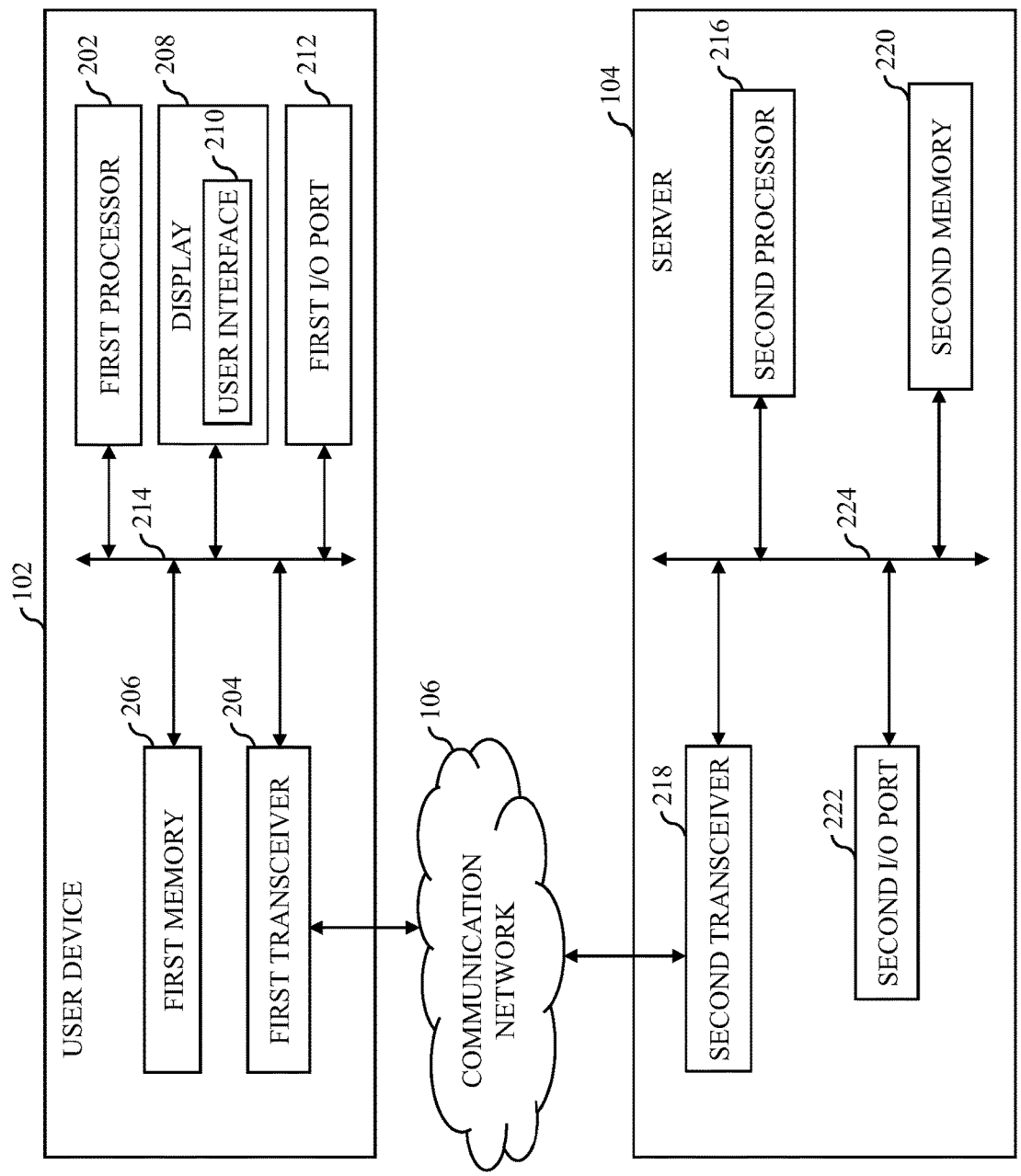
FIG. 2 is a block diagram that illustrates various components of a user device and a server of the environment of FIG. 1, in accordance with an embodiment of the present invention.

Referring now to FIG. 2, a block diagram that illustrates various components of the user device 102 and the server 104, in accordance with an embodiment of the present invention. The user device 102 includes circuitry, such as a first processor 202, a first transceiver 204, a first memory 206, a display 208 that is capable of rendering a graphical user interface (GUI) such as a user interface 210, and a first input/output (I/O) port 212 that communicate with each other by way of a first communication bus 214. The server 104 includes circuitry, such as a second processor 216, a second transceiver 218, the memory of the server 104, i.e., a second memory 220, and a second I/O port 222 that communicate with each other by way of a second communication bus 224.

The first processor 202 includes suitable logic, circuitry, and/or interfaces that are operable to execute instructions stored in the first memory 206 to perform multiple operations. For example, the first processor 202 transmits the information associated with the geographical location to the second processor 216 by way of the first transceiver 204 over the communication network 106. In an embodiment, the first processor 202 receives the address or the geographical position from the user. In another embodiment, the first processor 202 captures and transmits Global Positioning Services (GPS) information of the user device 102 by means of one or more location-sensors (not shown) embedded in the user device 102. In a scenario, when the information associated with the geographical location is an address, the first processor 202 performs a geocoding operation to obtain the latitude and longitude of the geographical location and further transmits it to the second processor 216. In another scenario, the second processor 216 performs the geocoding operation.

The first processor 202 receives the risk score from the second processor 216, and displays the risk score on the display 208. In an embodiment, the first processor 202 receives the risk score by way of a Short Message Service (SMS). Examples of the first processor 202 include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the first processor 202 is compatible with multiple operating systems. It will further be apparent to a person skilled in the art that the first processor 202 may be compatible with multiple displays, for example, the display 208.

The first transceiver 204 includes suitable logic, circuitry, and/or interfaces that are operable to transmit (or receive) data to (or from) various devices, such as the second transceiver 218 over the communication network 106. For example, the first transceiver 204 transmits the information associated with the geographical location provided by the user by means of the first I/O port 212 or received by the first processor 202 by means of the one or more location-sensors (not shown) embedded in the user device 102, to the second transceiver 218 over the communication network 106. The first transceiver 204 receives the risk score, from the second transceiver 218 over the communication network 106. Examples of the first transceiver 204 include, but are not limited to, an antenna, a radio frequency transceiver, a wireless transceiver, and a Bluetooth transceiver. The first transceiver 204 communicates with the communication network 106, the first processor 202, and the second transceiver 218 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, or any combination thereof.

The first memory 206 includes suitable logic, circuitry, and/or interfaces to store the instructions that are executed by the first processor 202 to perform the multiple operations. The first memory 206 stores location information of one or more geographical locations. The first memory 206 further stores the risk score. Examples of the first memory 206 include, but are not limited to, a random-access memory (RAM), a read-only memory (ROM), a programmable ROM (PROM), and an erasable PROM (EPROM).

The display 208 includes suitable logic, circuitry, and/or interfaces that are operable to execute the instructions stored in the first memory 206 to perform multiple operations. The display 208 displays the service application or the web page based on the input provided by the user. The display 208 further displays the risk score. Examples of the display 208 include, but are not limited to, a Resistive Touchscreen Liquid Crystal Display (LCD), a thin-film transistor (TFT) LCD, an in-plane switching LCD, a Capacitive Touchscreen LCD, an Organic Light Emitting Diode (OLED), an Active-Matrix Organic Light Emitting Diode (AMOLED), a Super AMOLED, a Retina Display, and a Haptic/Tactile touchscreen.

The first I/O port 212 includes suitable logic, circuitry, and/or interfaces that are operable to execute the instructions stored in the first memory 206 to perform multiple operations. The first I/O port 212 may include input and output devices that are configured to operate under the control of the first processor 202 by way of the first communication bus 214. By means of the first I/O port 212, the user provides inputs to perform the multiple operations. For example, the user may provide inputs to open the service application or the web page on the user device 102, provide the information associated with the geographical location, and the like. Examples of the input devices may include a universal serial bus (USB) port, an Ethernet port, a real or virtual keyboard, a mouse, a joystick, a touch screen, a stylus, a microphone, and the like. Examples of the output devices may include the display 208, a speaker, headphones, a universal serial bus (USB) port, an Ethernet port, and the like.

The second processor 216 includes suitable logic, circuitry, and/or interfaces that are operable to execute instructions stored in the second memory 220 to perform multiple operations. For example, the second processor 216 receives the information associated with the geographical location from the first transceiver 204. In response to the received information, the second processor 216 retrieves the historical hazard data to identify the hazard associated with the geographical location from the second memory 220. Thus, the second processor 216 initiates the assessment of hazard risks on-the-fly, i.e., after it receives the information associated with the geographical location from the first transceiver 204. The second processor 216 further retrieves the set of files associated with the identified hazard from the second memory 220. The second processor 216 further retrieves the first and second sets of rules from the second memory 220. It will be apparent to a person skilled in the art that the second processor 216 identifies more than one hazard associated with the geographical location and retrieves corresponding files associated with the hazard.

The second processor 216 further performs the first set of geospatial operations on the first file and extracts the first data from the second memory 220 based on the first set of geospatial operations. The second processor 216 determines the first risk score based on the first data and the first set of rules associated with the hazard. The second processor 216 further initiates the criterion. In an embodiment, if the criterion is unmet, the second processor 216 transmits the first risk score to the first processor 202 by means of the second transceiver 218. If the criterion is met, the second processor 216 performs the second set of geospatial operations on the second file and extracts the second data from the second memory 220 based on the second set of geospatial operations. The second processor 216 determines the second risk score based on the second data and the second set of rules associated with the hazard. The second processor 216 transmits the second risk score to the first processor 202 by means of the second transceiver 218. In another embodiment, if the criterion is unmet, the second processor 216 determines the third risk score based on the third data extracted that is from the third file, and the third set of rules retrieved from the second memory 220. The second processor 216 further communicates the third risk score to the user on the user device 102. Examples of the second processor 216 include, but are not limited to, an ASIC processor, a RISC processor, a CISC processor, and a FPGA. It will be apparent to a person skilled in the art that the second processor 216 is compatible with multiple operating systems.

The second transceiver 218 includes suitable logic, circuitry, and/or interfaces that are operable to transmit (or receive) data to (or from) various devices, such as the first transceiver 204 over the communication network 106. For example, the second transceiver 218 receives the information associated with the geographical location, from the first transceiver 204. The second transceiver 218 transmits the risk score, to the first transceiver 204 over the communication network 106. Examples of the second transceiver 218 include, but are not limited to, an antenna, a radio frequency transceiver, a wireless transceiver, and a Bluetooth transceiver. The second transceiver 218 communicates with the communication network 106, the second processor 216, and the first transceiver 204 using various wired and wireless communication protocols, such as TCP/IP, UDP, 2G, 3G, 4G communication protocols, or any combination thereof.

The second memory 220 includes suitable logic, circuitry, and/or interfaces to store the instructions that are executed by the second processor 216 to perform the multiple operations. The second memory 220 manages and stores information associated with the geographical locations and the corresponding hazards. The second memory 220 stores the historical hazard data and the set of files. In an embodiment, the second memory 220 receives the historical hazard data and the sets of files associated with the hazard from a global database or a regional database. The second memory 220 further stores the data associated with the set of files, such as the first through third data. The data includes attributes such as distance to nearest polygon, distance to point, distance to line, and the like. The second memory 220 further stores the sets of rules associated with the hazard, such as the first through third sets of rules. In an embodiment, the second memory 220 is not a part of the server 104 but implemented as a database server. Examples of the second memory 220 include, but are not limited to, a RAM, a ROM, a PROM, and an EPROM.

The second I/O port 222 includes suitable logic, circuitry, and/or interfaces that are operable to execute the instructions stored in the second memory 220 to perform multiple operations. The second I/O port 222 may include various input and output devices that are configured to operate under the control of the second processor 216 by way of the second communication bus 224. For example, by means of the second I/O port 222, an administrator associated with the server 104 provides inputs to perform the multiple operations. Examples of the input devices may include a universal serial bus (USB) port, an Ethernet port, a real or virtual keyboard, a mouse, a joystick, a touch screen, a stylus, a microphone, and the like. Examples of the output devices may include a display screen, a speaker, headphones, a universal serial bus (USB) port, an Ethernet port, and the like.

Figure 3A:
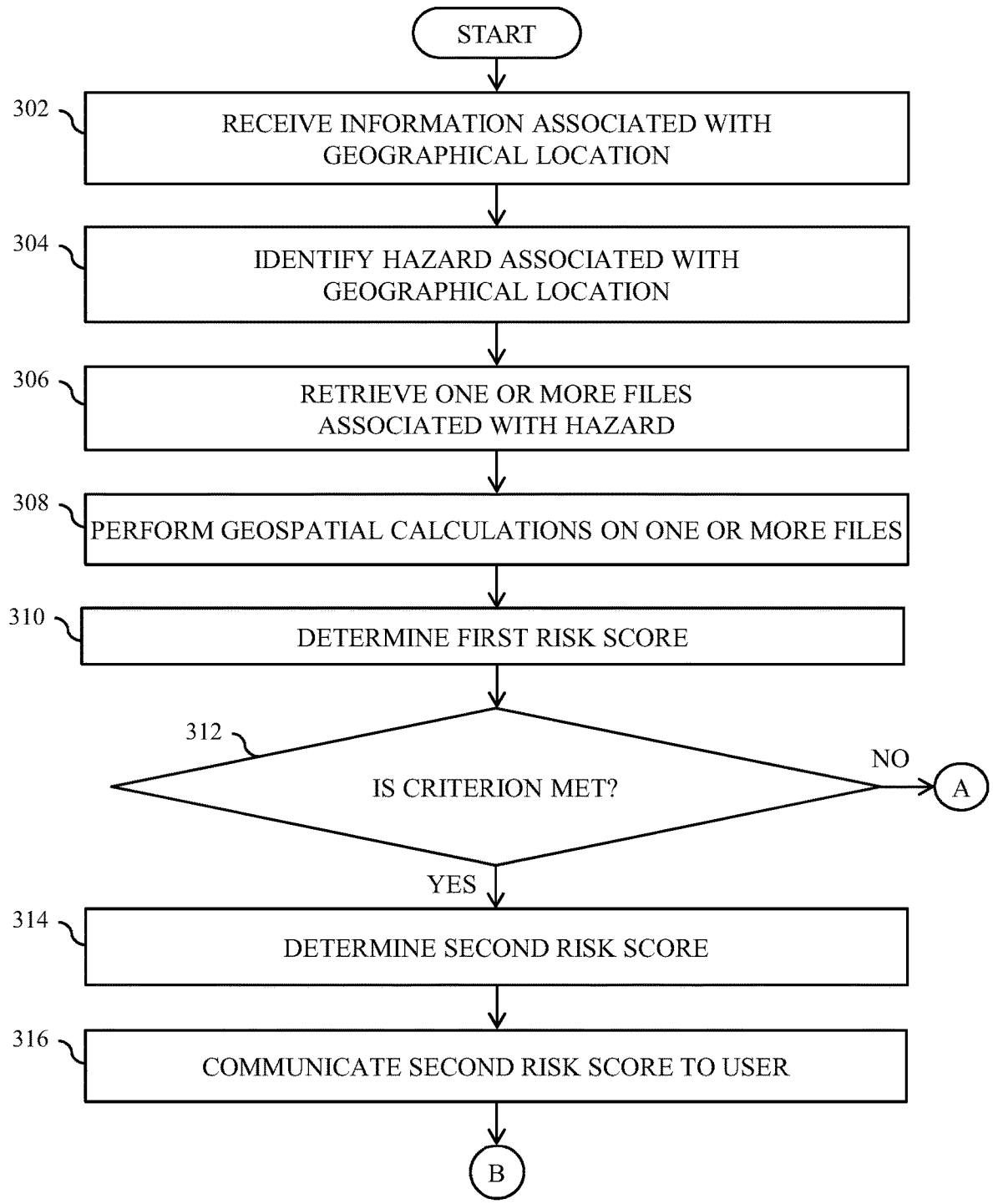
FIGS. 3A and 3B, collectively, are a flow chart that illustrate a method for assessing a hazard risk associated with a geographical location, in accordance with an embodiment of the present invention.
Figure 3B:
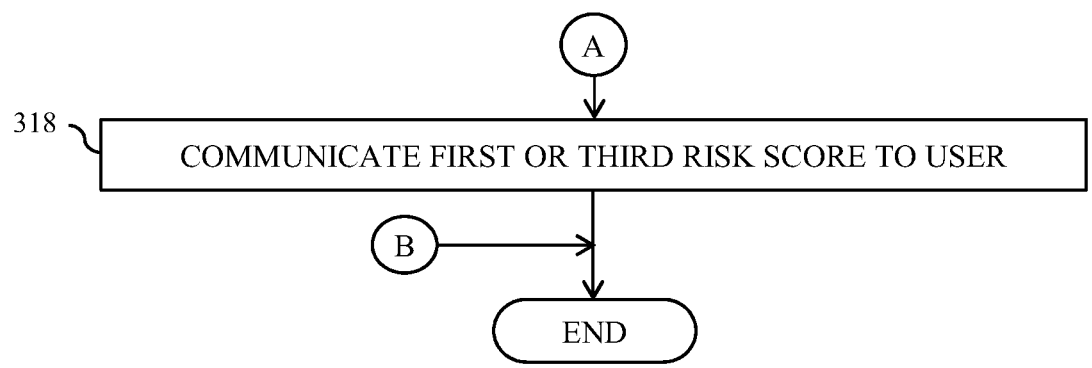

FIGS. 3A and 3B collectively are flow charts that illustrate a method for assessing a hazard risk associated with a geographical location, in accordance with an embodiment of the present invention. At step 302, the second processor 216 receives the information associated with the geographical location by way of the second transceiver 218 over the communication network 106. The information includes the address of the geographical location or the geographical position, i.e., latitude and longitude of the geographical location. In an embodiment, the user inputs details including an address or a geographical position. In another embodiment, the address of the geographical location is received by the server 104 based on GPS information transmitted by the user device 102 over the communication network 106. In an example, the user provides a geographical location 'X'.

At step 304, the second processor 216 identifies the hazard based on historical hazard data stored in the second memory 220 with the geographical location. When the second processor 216 receives the geographical location from the user, it retrieves the historical hazard data associated with the geographical location from the second memory 220. The second processor 216 identifies the hazard based on the historical hazard data. In the example, the historical hazard data includes records of robbery, aggravated assault, burglary, and the like associated with the geographical location 'X'. Thus, the second processor 216 identifies the hazard as 'crime' associated with the geographical location 'X'.

At step 306, the second processor 216 retrieves the set of files associated with the identified hazard from the second memory 220. The second processor 216 further retrieves the first and second sets of rules associated with the hazard from the second memory 220. In the example, the second processor 216 retrieves a set of files associated with the hazard 'crime'.

At step 308, the second processor 216 performs the first set of geospatial operations on the first file. It will be apparent to a person skilled in the art that the second processor 216 performs the first set of geospatial operations on multiple files. Based on the first set of geospatial operations, the second processor 216 extracts the first data from the second memory 220. In the example, a geographical area 'Y' that includes the geographical location 'X' is divided into multiple polygons. The first file thus includes the polygons, and the second memory 220 stores risk values associated with each polygon. A risk value may include a numeric value that indicates a preliminary risk associated with each polygon. The second processor 216 performs the first set of geospatial operations, i.e., the PIP operation to identify a polygon in which the geographical location 'X' lies. Based on the PIP operation, the second processor 216 extracts the risk value associated with the polygon from the second memory 220.

At step 310, the second processor 216 determines the first risk score based on the first data and the first set of rules. In the example, the second processor 216 determines the first risk score based on the extracted risk value and the first set of rules. The first set of rules dictate that if the extracted risk value is less than a first predetermined value, the geographical location 'X' is least likely to be affected by the hazard 'crime'. It will be apparent to a person skilled in the art that the first set of rules further dictates when the geographical location 'X' is moderately likely or most likely to be affected by the hazard 'crime'.

At step 312, the second processor 216 initiates the criterion and checks if the criterion is met. In the example, the criterion includes consideration of an additional factor such as distance between the geographical location 'X' and the polygons that are adjacent to the polygon that includes the geographical location 'X'. If the criterion is met, step 314 is executed. If the criterion is not met, step 318 is executed.

At step 314 the second processor 216 performs the second set of geospatial operations on the second file, to improve the accuracy of hazard risk assessment. It will be apparent to a person skilled in the art that the second processor 216 performs the second set of geospatial operations on multiple files. Based on the second set of geospatial operations, the second processor 216 extracts the second data from the second memory 220. Based on the second data and the second set of rules, the second processor 216 determines the second risk score. In the example, the second processor 216 performs the DTL operation to determine the distances between the geographical location 'X' and the polygons that are adjacent to the polygon that includes the geographical location 'X'. The second processor 216 determines the number of polygons that are within a predetermined distance, in an example 1500 feet of the geographical location 'X'. The second processor 216 performs multiple PIP operations to extract the risk values of the polygons. The second processor 216 determines a mathematical average of the risk scores that include the first risk score and intermediate risk scores. The intermediate risk scores are determined based on corresponding extracted risk values and the first set of rules. Based on the mathematical average and the second set of rules, the second processor 216 determines the second risk score. The second set of rules dictate that if the mathematical average is less than a second predetermined value, the geographical location 'X' is least likely to be affected by the hazard 'crime'. It will be apparent to a person skilled in the art that the second set of rules further dictates when the geographical location 'X' is fairly likely or most likely to be affected by the hazard 'crime'.

At step 316, the second processor 216 communicates the second risk score to the user by transmitting the second risk score to the user device 102.

At step 318, the second processor 216 communicates the first risk score to the user by transmitting the first risk score to the user device 102. In another embodiment, when the criterion is not met, the second processor 216 determines the third risk score based on the third data that is extracted from the third file and the third set of rules associated with the hazard that are retrieved from the second memory 220. The second processor 216 further communicates the third risk score to the user by transmitting the third risk score to the user device 102. Thus, the method determines the first through third risk scores on-the-fly and does not rely on predetermined risk scores. The various examples of the method of FIGS. 3A and 3B have been described in detail in conjunction with FIGS. 4-6.

Figure 4A:
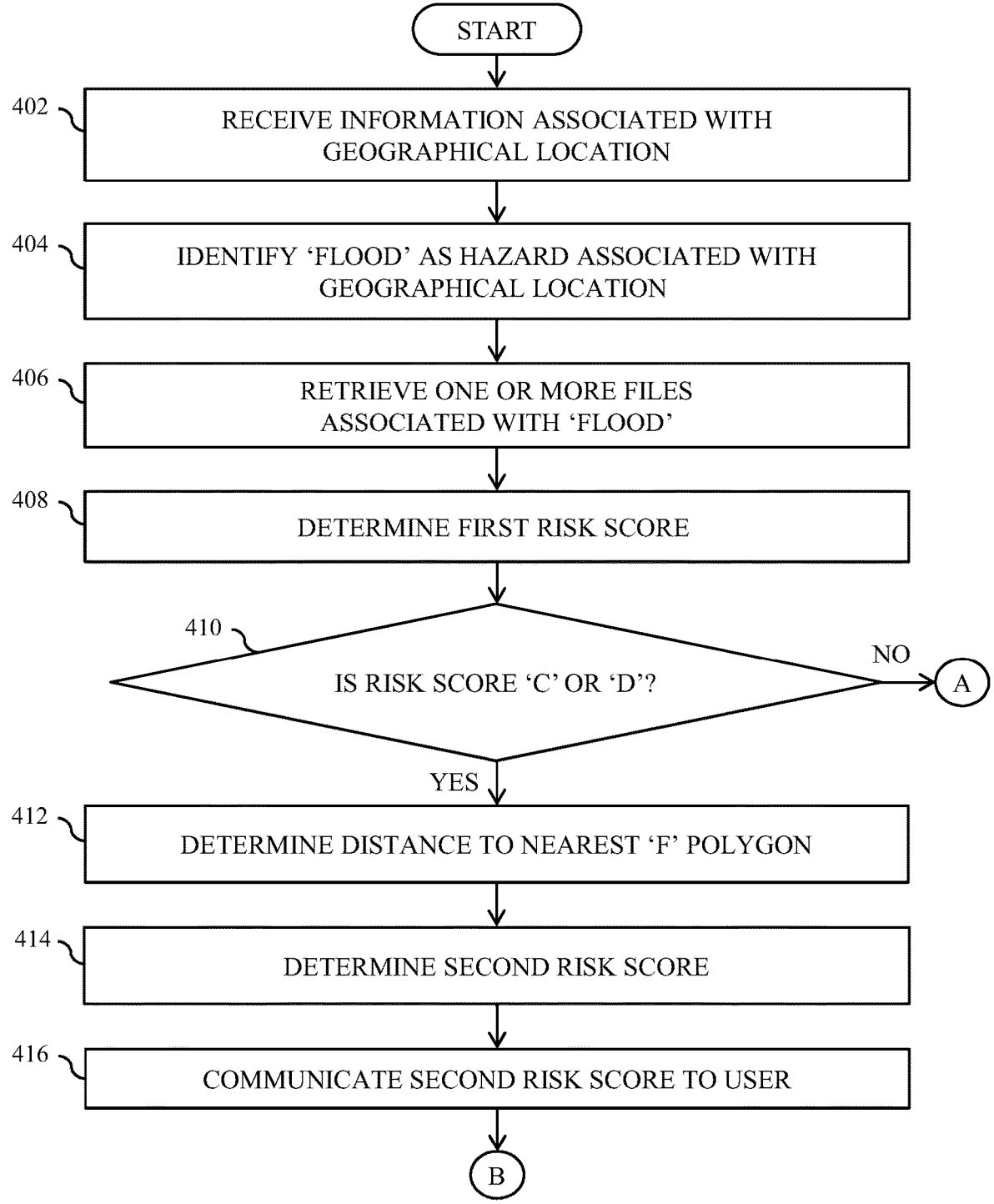
FIGS. 4A and 4B, collectively, are a flow chart that illustrate a method for assessing a flood risk associated with a geographical location, in accordance with an embodiment of the present invention.
Figure 4B:
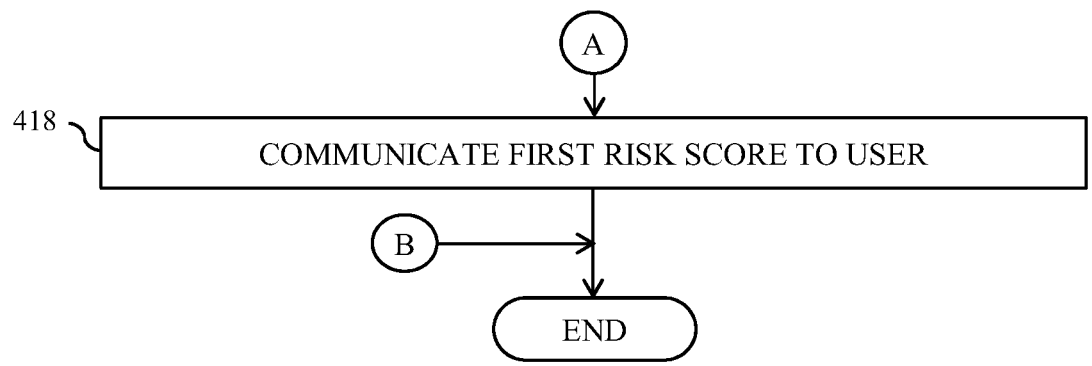

FIGS. 4A and 4B collectively are flow charts that illustrate a method for assessing a flood risk associated with a geographical location, in accordance with an embodiment of the present invention. At step 402, the second processor 216 receives information associated with the geographical location by way of the second transceiver 218 over the communication network 106.

At step 404, the second processor 216 identifies 'flood' as the hazard based on historical hazard data stored in the second memory 220 with the geographical location. The historical hazard data includes records of floods occurred across a country, for example a country 'J' that includes the geographical location, and level of damages caused by each flood. It will be apparent to a person skilled in the art that the second processor 216 identifies additional hazards associated with the geographical location.

At step 406, the second processor 216 retrieves the set of files from the second memory 220 based on the hazard 'flood'. The set of files include information related to the hazard 'flood' that enables the second processor 216 to determine a risk score for the geographical location.

At step 408, the second processor 216 determines the first risk score based on the first set of geospatial operations. The second processor 216 performs the PIP operation on the first file to identify a polygon in which the geographical location is located. The first file includes a geographical area in the form of polygons and each polygon indicates a flood risk associated with the polygon. The second memory 220 stores the risk value associated with each polygon. The second processor 216 extracts the first data, i.e., the risk value of the polygon from the second memory 220. In one embodiment, the second processor 216 extracts the first data from the first file to determine the first risk score. In an embodiment, the extracted first data is the first risk score. In another embodiment, the second processor 216 performs a predetermined operation on the extracted first data to determine the first risk score.

At step 410, the second processor 216 initiates the criterion to check if the first risk score is 'C' or 'D'. The first risk score of 'C' or 'D' signifies that the geographical location is moderately or more likely to be affected by the hazard 'flood'. If the first risk score is 'C' or 'D', step 412 is executed. If the first risk score is not 'C' or 'D', step 418 is executed.

At step 412, the second data, i.e., a distance of the geographical location to a nearest polygon with a risk score of 'F' (highest risk score) is determined. The second processor 216 performs the DTL or the DTP operation on the first file to determine the distance. In another embodiment, the second processor 216 performs the DTL or DTP operation on the second file to determine the distance.

At step 414, the second processor 216 determines the second risk score based on the second data and the second set of rules associated with the hazard 'flood' retrieved from the second memory 220. The set of rules dictates that if the distance is less than 100 feet, the second risk score is an 'F'. Further if the distance is more than or equal to 100 feet, the second risk score is same as the first risk score.

At step 416, the second processor 216 communicates the second risk score to the user by transmitting the second risk score to the user device 102.

At step 418, the second processor 216 communicates the first risk score to the user by transmitting the first risk score to the user device 102. For example, the second processor 216 communicates the first risk score to the user when the first risk score is one of an 'A', a 'B', or an 'F'.

Figure 5:
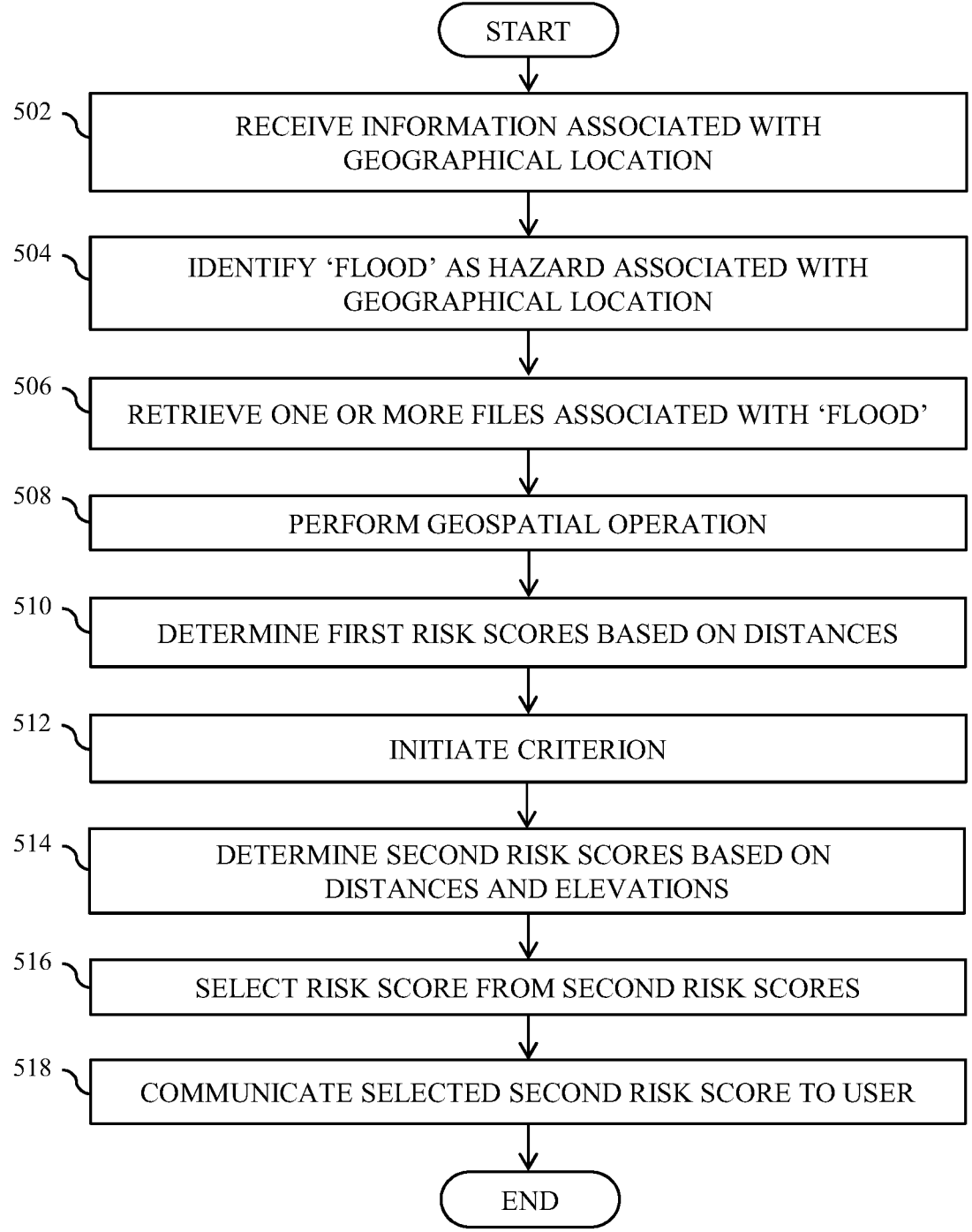
FIG. 5 is a flow chart that illustrates a method for assessing the flood risk associated with a geographical location, in accordance with another embodiment of the present invention.

FIG. 5 is a flow chart that illustrates a method for assessing the flood risk associated with a geographical location, in accordance with another embodiment of the present invention. At step 502, the second processor 216 receives the information associated with the geographical location by way of the second transceiver 218 over the communication network 106. The information includes an address of the geographical location or the geographical position, i.e., latitude and longitude of the geographical location.

At step 504, the second processor 216 identifies 'flood' as the hazard based on the historical hazard data stored in the second memory 220 with the geographical location.

At step 506, the second processor 216 retrieves the set of files associated with the hazard 'flood' from the second memory 220. The set of files include information such as 'distance' and 'elevation' of the geographical location to water bodies such as streams, lakes, and ponds that enables the second processor 216 to determine a risk score for the geographical location associated with the hazard 'flood'. The second processor 216 further retrieves the first and second sets of rules that are associated with the hazard 'flood' from the second memory 220. In an example, a first file includes a set of stream lines, a second file includes a set of stream polygons, and a third file includes a set of lake and pond polygons.

At step 508, the second processor 216 performs the DTL operation on the first file to determine a first distance between the geographical location and a stream line. The second processor 216 performs the DTP operation on the second and third files to determine second and third distances between the geographical location and stream polygons and lake and pond polygons, respectively.

At step 510, the second processor 216 determines corresponding first risk scores for the first through third files, respectively, based on the first through third distances and the first set of rules. In an example, the first set of rules dictate that the geographical locations that are close to the stream polygon, i.e., within 1000 feet, are assigned a higher risk score, such as 'D' or 'F' and the geographical locations that are far from the stream polygon, i.e., more than 3000 feet, are assigned a lower risk score, such as 'A' or 'B'. Similarly, the first set of rules dictate the determination of the first risk scores associated with the stream line and lake and pond polygons.

At step 512, the second processor 216 initiates the criterion to determine the second data, i.e., first through third elevation differences, between the geographical location and the stream line, stream polygon, and lake and pond polygons, respectively.

At step 514, the second processor 216 determines the corresponding second risk scores based on the first through third distances and the first through third elevation differences. The second processor 216 uses the second set of rules to determine the corresponding second risk scores. In an example, the second set of rules dictate that the geographical location having a lower first risk score, such as an 'A' or a 'B' associated with the stream polygon may be affected by the hazard 'flood' occurring in the stream polygon if the corresponding elevation difference is within 20 feet. Hence, the risk score associated with the stream polygon for the geographical location is no longer an 'A' or a 'B' but is adjusted to a 'D' or an 'F' to provide accuracy in the hazard 'flood' risk assessment. The adjusted risk score is the second risk score associated with the stream polygon. Similarly, the second set of rules dictate the determination of the second risk scores associated with the stream line and lake and pond polygons. Thus, the corresponding second risk scores indicate the level of flood risk associated with the stream line, stream polygon, and lake and pond polygons, respectively.

At step 516, the second processor 216 selects one risk score from the second risk scores. In an embodiment, the second processor 216 selects the risk score with a highest risk level of the three second risk scores. In an example, if the second risk scores associated with the stream line, the stream polygon, and the lake and pond polygons are 'C', 'F', and 'D', respectively, the second processor 216 selects risk score with highest risk level, i.e., 'F' as the second risk score.

At step 518, the second processor 216 communicates the selected second risk score to the user by transmitting the selected second risk score to the user device 102.

Figure 6A:
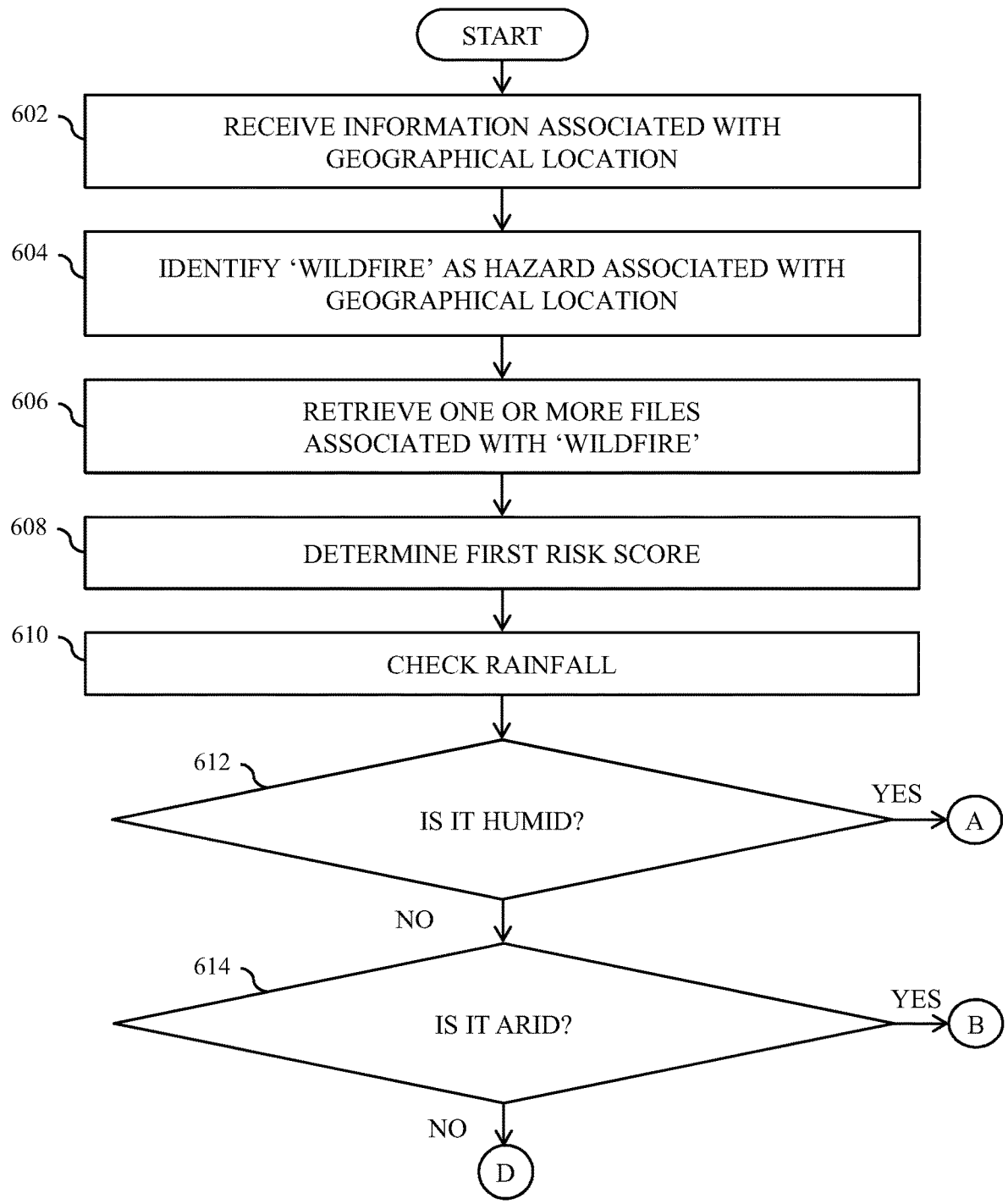
FIGS. 6A, 6B, and 6C, collectively, are a flow chart that illustrate a method for assessing a wildfire risk associated with a geographical location, in accordance with an embodiment of the present invention.
Figure 6B:
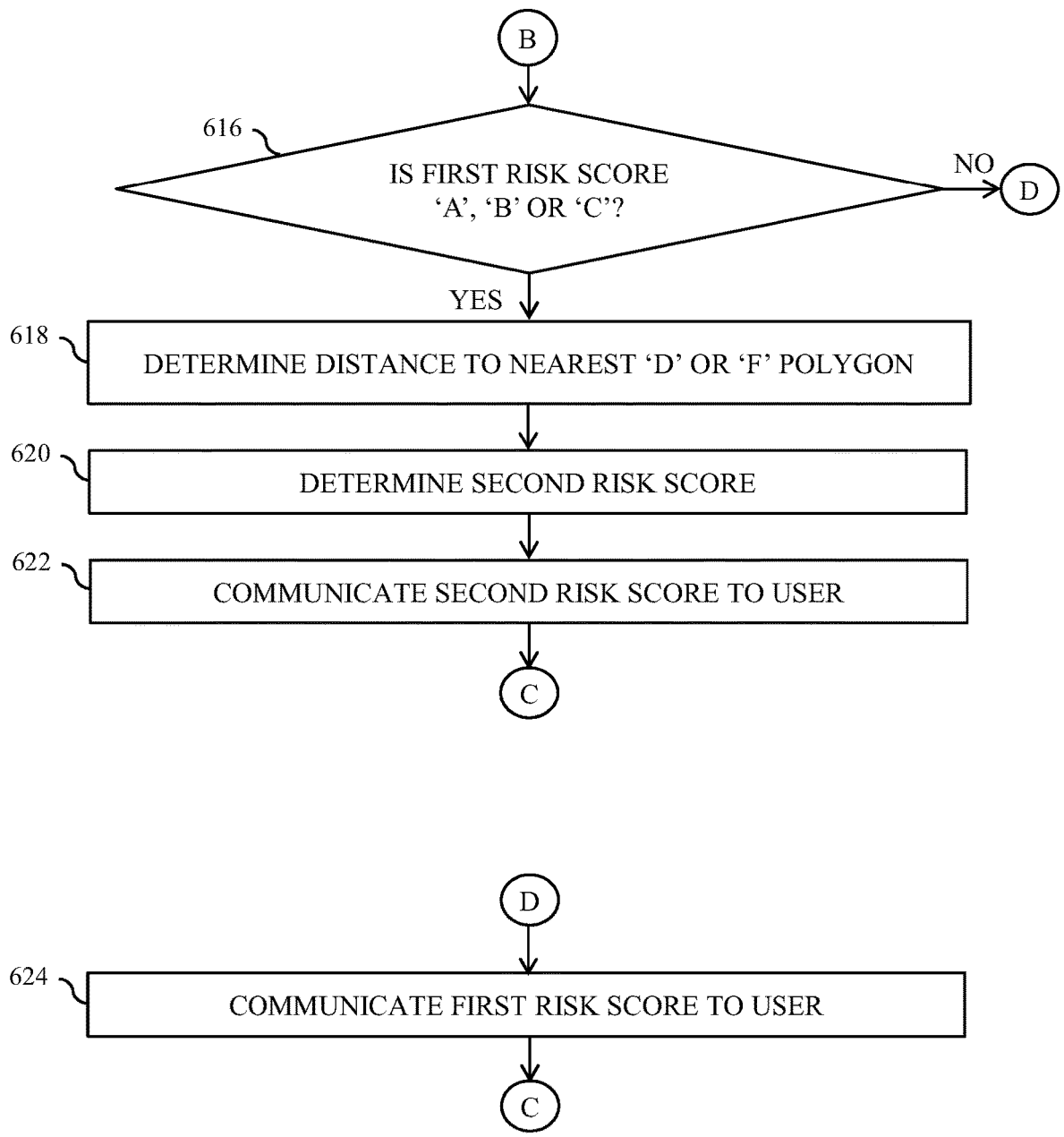
Figure 6C:
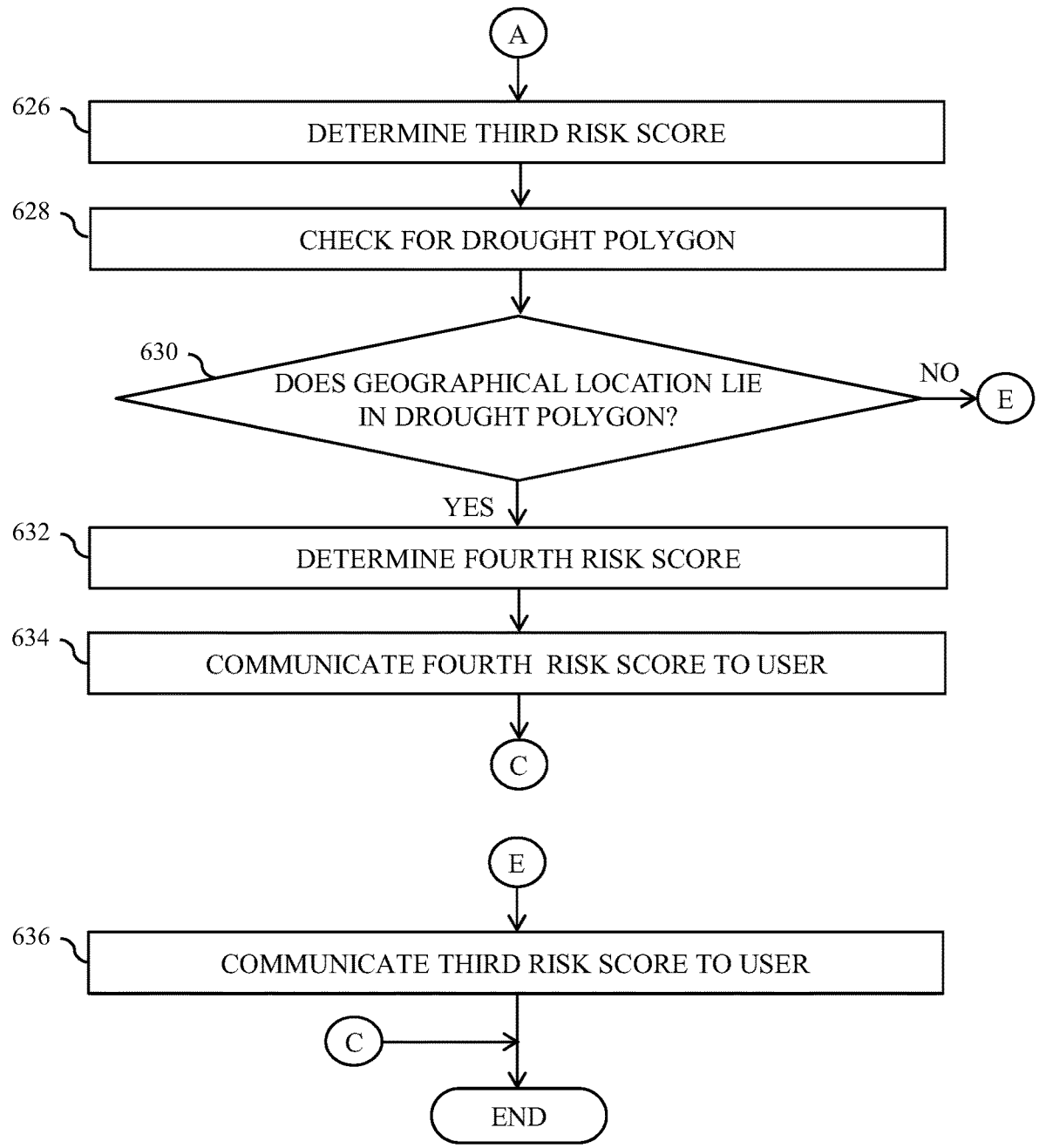

FIGS. 6A, 6B, and 6C collectively are flow charts that illustrate a method for assessing a wildfire risk associated with a geographical location, in accordance with an embodiment of the present invention. At step 602, the second processor 216 receives information associated with the geographical location by way of the second transceiver 218 over the communication network 106. The information includes an address of the geographical location or the geographical position, i.e., latitude and longitude of the geographical location.

At step 604, the second processor 216 identifies 'wildfire' as the hazard based on historical hazard data stored in the second memory 220 for the geographical location. For example, when the second processor 216 receives a geographical location 'Z' which is in the geographical area 'L', the second processor 216 retrieves the historical hazard data associated with the geographical location 'Z' and the geographical area 'L'. The historical hazard data includes accounts of wildfire with the geographical location 'Z' and the geographical area 'L'. Based on the historical hazard data, the second processor 216 identifies 'wildfire' as one of the hazard associated with the geographical location 'Z'. It will be apparent to a person skilled in the art that the second processor 216 further retrieves additional historical hazard data to identify corresponding hazards associated with the geographical location 'Z'.

At step 606, the second processor 216 retrieves the set of files associated with the hazard 'wildfire' from the second memory 220. In the example, the set of files include information related to the hazard 'wildfire' such as a wildland fuel load, an urban or wildland interface, and housing density that enables the second processor 216 to determine a risk score for the geographical location 'Z' associated with the hazard 'wildfire'. The second processor 216 further retrieves the first and second sets of rules that are associated with the hazard 'wildfire' from the second memory 220.

At step 608, the second processor 216 performs the PIP operation on the first file to identify a first polygon in which the geographical location is located. The second processor 216 extracts the first data, i.e., the risk value of the first polygon, from the second memory 220. In one embodiment, the second processor 216 extracts the first data from the first file. The second processor 216 determines the first risk score based on the first data. In an embodiment, the extracted risk value is the first risk score. In another embodiment, the second processor 216 performs a predetermined operation on the extracted risk value to determine the first risk score.

At step 610, the second processor 216 performs the PIP operation on the second file to initiate a first criterion, i.e., check an average rainfall. The second file includes multiple polygons and the second memory 220 stores the average rainfall in the geographical area associated with each polygon. Based on a result of the PIP operation, the second processor 216 determines a second polygon in which the geographical location is located. The second processor 216 extracts the average rainfall of the second polygon from the second memory 220. The determination of average rainfall improves the risk assessment for the hazard 'wildfire'.

At step 612, the second processor 216 checks if the geographical location is a humid region based on a value of the average rainfall. If the geographical location is a humid region, step 626 is executed. If the geographical location 'Z' is not a humid region, step 614 is executed.

At step 614, the second processor 216 checks if the geographical location is an arid region based on the value of the average rainfall. If the geographical location is an arid region, step 616 is executed. If the geographical location is not an arid region, step 624 is executed.

At step 616, the second processor 216 initiates a second criterion, i.e., checks if the first risk score is 'A', 'B', or 'C'. If the first risk score is 'A', 'B', or 'C', step 618 is executed. If the first risk score is not 'A', 'B', or 'C', step 624 is executed.

At step 618, the second processor 216 performs the DTL or the DTP operation on the second file to determine the second data, i.e., a distance of the geographical location to the nearest polygon that has a risk score of 'D' or 'F'. In another embodiment, the second processor 216 performs the DTL or the DTP operation on the third file to determine the distance of the geographical location to the nearest polygon with the risk score of 'D' or 'F'.

At step 620, the second processor 216 determines the second risk score based on the second data and the first set of rules. The first set of rules dictate that if the distance of the geographical location to the nearest polygon that has a risk score of 'D' or 'F' is less than 1000 feet, the second risk score is 'D' or 'F'. The first set of rules further dictate that if the distance is more than or equal to 1000 feet, the second risk score is same as the first risk score.

At step 622, the second processor 216 communicates the second risk score to the user by transmitting the second risk score to the user device 102.

At step 624, the second processor 216 communicates the first risk score to the user by transmitting the first risk score, for example 'D', to the user device 102.

At step 626, the second processor 216 adjusts the first risk score to a third risk score since the geographical location is in the humid region. In an embodiment, the third risk score has a higher risk level than the first risk score.

At step 628, the second processor 216 initiates a third criterion, i.e., checks if the geographical location lies in a drought polygon. A fourth file includes multiple drought polygons indicating drought zones.

At step 630, the second processor 216 performs the PIP operation on the fourth file to determine if the geographical location is located in a drought polygon. The second processor 216 checks the result of the PIP operation to determine if the geographical location is located in the drought polygon. If the geographical location is located in the drought polygon, step 632 is executed. If the geographical location is not located in the drought polygon, step 636 is executed.

At step 632, the second processor 216 determines a fourth risk score based on the third risk score and the second set of rules. The second set of rules dictate that the geographical location that lies in a drought region may be affected by the hazard 'wildfire' even if its first risk score indicates that it is less likely to be affected. Hence, the risk score for the geographical location 'Z' is adjusted to provide accuracy in the hazard risk assessment.

At step 634, the second processor 216 communicates the fourth risk score to the user by transmitting the fourth risk score to the user device 102.

At step 636, the second processor 216 communicates the third risk score to the user by transmitting the third risk score to the user device 102.

Figure 7:
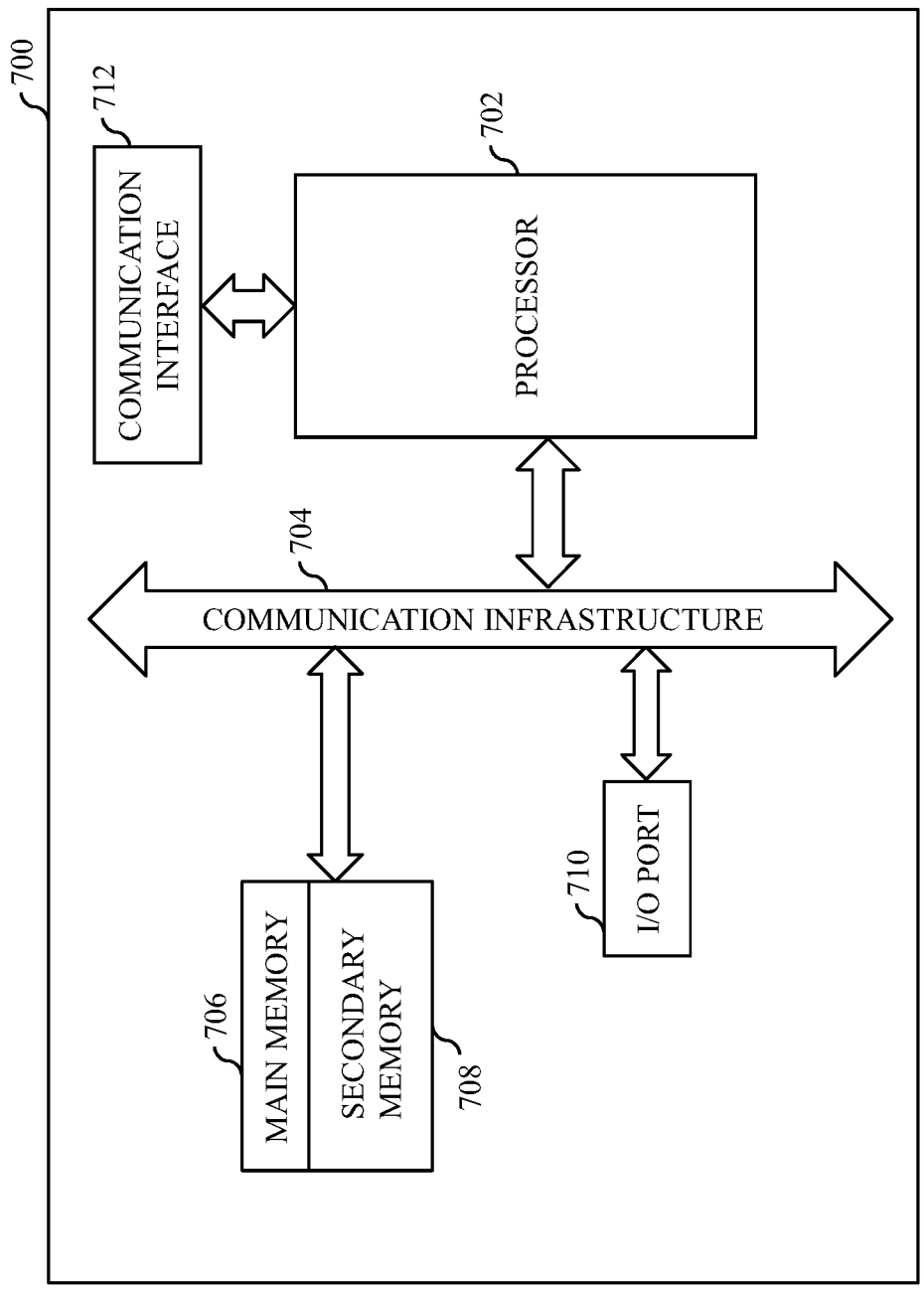
FIG. 7 is a block diagram that illustrates a computer system for assessing the hazard risks associated with the geographical locations, in accordance with an embodiment of the present invention.

Referring now to FIG. 7, a block diagram that illustrates a computer system 700 for assessing the hazard risks associated with the geographical locations, in accordance with an embodiment of the present invention. An embodiment of the present invention, or portions thereof, may be implemented as computer readable code on the computer system 700. In one example, the server 104 of FIG. 1 may be implemented as the computer system 700 using hardware, software, firmware, non-transitory computer readable media having instructions stored thereon, or a combination thereof and may be implemented as one or more computer systems or other processing systems. Hardware, software, or any combination thereof may embody modules and components used to implement the methods of FIGS. 3-3B, 4A-4B, 5, and 6A-6C.

The computer system 700 includes a processor 702 that may be a special purpose or a general-purpose processing device. The processor 702 may be a single processor, multiple processors, or combinations thereof. The processor 702 may have one or more processor "cores." Further, the processor 702 may be connected to a communication infrastructure 704, such as a bus, a bridge, a message queue, the communication network 106, multi-core message-passing scheme, and the like. The computer system 700 further includes a main memory 706 and a secondary memory 708. Examples of the main memory 706 may include a random-access memory (RAM), a read-only memory (ROM), and the like. The secondary memory 708 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 700 further includes an input/output (I/O) port 710 and a communication interface 712. The I/O port 710 includes various input and output devices that are configured to communicate with the processor 702. Examples of the input devices may include a keyboard, a mouse, a joystick, a touchscreen, a microphone, and the like. Examples of the output devices may include a display screen, a speaker, headphones, and the like. The communication interface 712 may be configured to allow data to be transferred between the computer system 700 and various devices that are communicatively coupled to the computer system 700. Examples of the communication interface 712 may include a modem, a network interface, i.e., an Ethernet card, a communications port, and the like. Data transferred via the communication interface 712 may be signals, such as electronic, electromagnetic, optical, or other signals as will be apparent to a person skilled in the art. The signals may travel via a communications channel, such as the communication network 106 which may be configured to transmit the signals to the various devices that are communicatively coupled to the computer system 700. Examples of the communication channel may include, but are not limited to, cable, fiber optics, a phone line, a cellular phone link, a radio frequency link, a wireless link, and the like.

Computer program medium and computer usable medium may refer to memories, such as the main memory 706 and the secondary memory 708, which may be a semiconductor memory such as dynamic RAMs. These computer program mediums may provide data that enables the computer system 700 to implement the methods illustrated in FIGS. 3A-3B, 4A-4B, 5, and 6A-6C. In an embodiment, the present invention is implemented using a computer implemented application. The computer implemented application may be stored in a computer program product and loaded into the computer system 700 using the removable storage drive or the hard disc drive in the secondary memory 708, the I/O port 710, or the communication interface 712.

A person having ordinary skill in the art will appreciate that embodiments of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 702, and a memory, such as the main memory 706 and the secondary memory 708, implement the above described embodiments. Further, the operations may be described as a sequential process; however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Specific advantages of the method and the system for assessing the hazard risks include use of more than one factor for determination of the risk score. The additional factors ensure that various conditions related to the hazard risk are thoroughly considered and the determined risk scores are fairly accurate. The risk scores associated with the geographical location are not predetermined. On the contrary, the method and the system determine the risk scores on-the-fly, i.e., dynamically, and do not provide the risk scores to the user that are determined beforehand, as done by traditional methods of hazard risk assessment. The method and the system eliminate the need for rebuilding a geospatial file for reflecting any updates in the risk scores. A user may utilize the risk score in renting or buying a property, insurance policy pricing, insurance underwriting, reinsurance underwriting, suggestions for necessary mitigations, buying decisions, siting decisions, managing portfolio determinations, and the like. Thus, the method and the system overcome the disadvantages of the traditional methods for assessing the hazard risks associated with the geographical locations.

Techniques consistent with the present invention provide, among other features, systems and methods for assessing the hazard risks associated with the geographical locations. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

The invention claimed is:

1. A method for assessing hazard risks associated with geographical locations, the method comprising:
   receiving, by a server, information associated with a geographical location;
   identifying, by the server, a hazard that is associated with the geographical location based on hazard data;
   retrieving, by the server, one or more files associated with the hazard;
   performing, by the server, a first set of geospatial operations on one or more files;
   extracting, by the server, a first data based on the first set of geospatial operations;
   determining, by the server, a first risk score for the geographical location based on the first data generated by the geospatial operations and at least the one or more files or a first set of rules associated with the hazard;
   initiating, by the server, a criterion associated with the hazard;
   determining, by the server, whether the first risk score meets the criterion;
   in response to determining that the first risk score meets the criterion associated with the hazard, determining, by the server, a second risk score for the geographical location, wherein determining the second risk score comprises:
      performing, by the server, a second set geospatial operations on one or more files;
      extracting, by the server, a second data based on the second set of geospatial operations;
      determining, by the server, an intermediate risk score, based upon the second data and first set of rules; and
      determining, by the server, a mathematical average of the first risk score and intermediate risk score;
      wherein the second risk score for the geographical location is determined based on the mathematical average and a second set of rules; and
   communicating, by the server, at least one of the first risk score or the second risk score associated with the geographical location to a user, wherein the first risk score and the second risk score indicate a level of severity of the hazard for the geographical location;
   wherein at least one of the first risk score and the second risk score are used to dynamically assess hazard risks.

2. A method of claim 1, wherein the information includes at least an address or a geographical position of the geographical location.

3. The method of claim 2, wherein the information is received from a user device.

4. The method of claim 1, wherein the server retrieves the hazard data and the one or more files from a memory.

5. The method of claim 1, wherein the hazard includes at least one of a flood, a coastal storm surge, a tsunami, a wildfire, a damaging wind, a hailstorm, a tornado, lightning strikes, a hurricane, an earthquake, a fracking induced earthquake, radiations from radioactive zones and nuclear power plants, wind borne debris, a landslide, a lava flow, brownfield or superfund sites, leaking of underground storage tanks, a crime, volcanic eruptions, or any other natural or man-made hazards.

6. The method of claim 1, wherein the one or more files include a plurality of geospatial elements.

7. The method of claim 6, wherein the plurality of geospatial elements includes at least lines, points, polygons, or raster cells.

8. The method of claim 1, wherein the criterion associated with the hazard is based on at least the first risk score or the one or more files.

9. The method of claim 1, wherein the server communicates the first risk score to the user when the criterion associated with the hazard is unmet and communicates the second risk score to the user when the criterion associated with the hazard is met.

10. The method of claim 1, further comprising determining, by the server, a third risk score for the geographical location based on at least the one or more files or a third set of rules associated with the hazard, wherein the third risk score is determined when the criterion associated with the hazard is unmet.

11. A system for assessing hazard risks associated with geographical locations, the system comprising:
    a server configured to:
       receive information associated with a geographical location;
       identify a hazard that is associated with the geographical location based on hazard data;
       retrieve one or more files associated with the hazard;
       perform geospatial operations on one or more files;
       extract a first data based on the geospatial operations;
       determine a first risk score for the geographical location based on the first data generated by the geospatial operations and at least the one or more files or a first set of rules associated with the hazard;
       initiate a criterion associated with the hazard;
       determine whether the first risk score meets the criterion;
       in response to determining that the first risk score meets the criterion associated with the hazard, determine a second risk score for the geographical location, wherein determining the second risk score comprises:
          perform a second set geospatial operations on one or more files;
          extract a second data based on the second set of geospatial operations:
          determine an intermediate risk score, based upon the second data and first set of rules; and
          determine a mathematical average of the first risk score and intermediate risk score;
          wherein the second risk score for the geographical location is determined based on the mathematical average and a second set of rules; and
       communicate at least one of the first risk score or the second risk score associated with the geographical location to a user, wherein the first risk score and the second risk score indicate a level of severity of the hazard for the geographical location;
       wherein at least one of the first risk score and the second risk score are used to dynamically assess hazard risks.

12. The system of claim 11, wherein the information includes at least an address or a geographical position of the geographical location.

13. The system of claim 11, wherein the information is received from a user device.

14. The system of claim 11, wherein the server retrieves the hazard data and the one or more files from a memory.

15. The system of claim 11, wherein the hazard includes at least one of a flood, a coastal storm surge, a tsunami, a wildfire, a damaging wind, a hailstorm, a tornado, lightning strikes, a hurricane, an earthquake, a fracking induced earthquake, radiations from radioactive zones and nuclear power plants, wind borne debris, a landslide, a lava flow, brownfield or superfund sites, leading of underground storage tanks, a crime, volcanic eruptions, or any other natural or man-made hazards.

16. The system of claim 11, wherein the one or more files include a plurality of geospatial elements.

17. The system of claim 16, wherein the plurality of geospatial elements includes at least lines, points, polygons, or raster cells.

18. The system of claim 11, wherein the criterion associated with the hazard is based on at least the first risk score or the one or more files.

19. The system of claim 11, wherein the server communicates the first risk score to the user when the criterion associated with the hazard is unmet and communicates the second risk score to the user when the criterion associated with the hazard is met.

20. The system of claim 11, wherein the server is further configured to determine a third risk score for the geographical location based on at least the one or more files or a third set of rules associated with the hazard, and wherein the third risk score is determined when the criterion associated with the hazard is unmet.

* * * * *